J. C. CROWLEY.
PROCESS AND APPARATUS FOR MAKING SHEET GLASS.
APPLICATION FILED MAY 8, 1922.
Reissued Sept. 12, 1922. 15,452.
FIG. 1
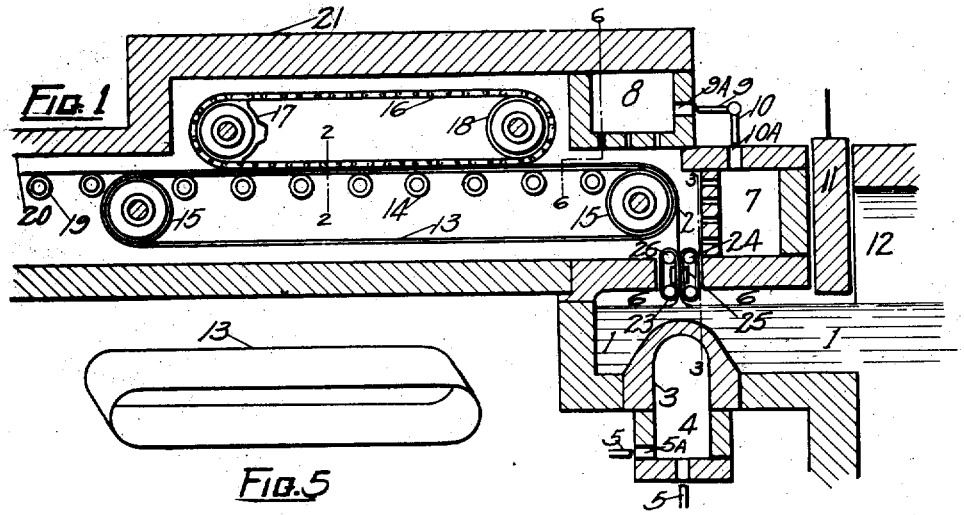
FIG. 5
FIG. 2
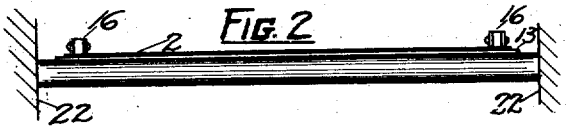
FIG. 4
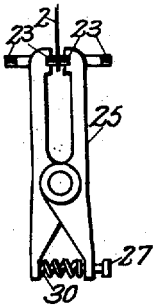
FIG. 6
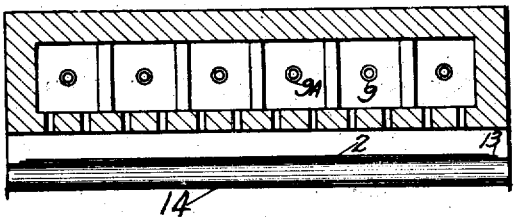
FIG. 3
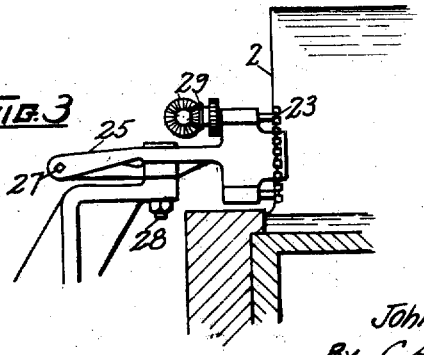
INVENTOR
John C. Crowley
BY C. A. Rowley
ATTORNEY Reissued Sept. 12, 1922. Re. 15,452

UNITED STATES PATENT OFFICE.

JOHN C. CROWLEY, OF CLEVELAND, OHIO, ASSIGNOR TO THE LIBBEY-OWENS SHEET GLASS COMPANY, OF TOLEDO, OHIO, A CORPORATION OF OHIO.

PROCESS AND APPARATUS FOR MAKING SHEET GLASS.

Original No. 1,342,533, dated June 8, 1920. Serial No. 243,981, filed July 8, 1918. Application for reissue filed May 8, 1922. Serial No. 559,431.

*To all whom it may concern:*

Be it known that I, JOHN C. CROWLEY, of Cleveland, Ohio, county of Cuyahoga, and State of Ohio, have invented a new and useful Process and Apparatus for Making Sheet Glass, which invention is fully set forth in the following specification.

This invention relates to the art of drawing glass in sheet form from a mass of molten glass, and more particularly, it relates to the usage of an endless metal belt upon which the sheet is drawn and bent, to side holding devices as a mechanical means of sheet control and to the fire boxes that govern the plasticity of the sheet as it is being drawn.

My experience with glass shows clearly that the sheet glass process is cheaper than any and all other processes. Or, in other words, sheet glass can be made at a far less cost than glass made in a cylinder form. This is because in the sheet glass process skilled labor is not needed, the production is large and the method is automatic and continuous. The object of this invention is therefore to provide and create a substantially continuous sheet glass machine.

Figure 1 is a longitudinal section through the machine and adjoining portions of the tank and the lehr. Fig. 2 is a section 2—2 of Fig. 1. Fig. 3 is a partial section 3—3 of Fig. 1 showing the edge holding device. Fig. 4 is a plan view of Fig. 3. Fig. 5 is a perspective sketch of the endless belt. Fig. 6 is a section 6—6 of Fig. 1 and shows the partitional boxes.

Referring to Figs. 1 to 6, the reference numeral 1 indicates a mass of molten glass which may be superheated by means of heat from the furnace 12 and the fire box 4. The fire box 4 has a series of burner holes 5A, located in a suitable and a low position, through which the burners 5 direct the fluid fuel. The cover 3 of the fire box 4 forms a portion of the bottom of the receptacle which contains the molten glass 1. The glass 1 is covered, excepting a slot, through which the sheet is drawn. The chambers 6 may be used to regulate the temperature of the surface of the glass. The drums 15 extend across the inside and through the machine and are placed a suitable distance apart. The rollers 14 also extend across the inside and through the machine and are placed a suitable distance apart and level with the drums 15. The endless metal belt 13 is placed around the drums 15 and stretched to a tension necessary for running conditions. The rollers keep the upper portion of the belt 13 from sagging. Both drums 15 are mounted on power shafts. The lehr 20 contains driving rollers 19. The draft chains 16 are driven by sprockets 17. The drum 18 is an idler. The belt 13 and draft chains 16 are contained within the refractory walls 22 of the machine. The fire box 7 is used to heat the sheet 2 before it is bent. The burners 10 direct their heating fluid through the holes 10A. The fire box 8 is used to heat the sheet 2 after it is bent. The burners 9 direct their heat through the holes 9A. Both fire boxes are partitioned as indicated by Fig. 6. The hanging block 11 has a two fold purpose. It may be used as a plug to stop the glass 1 whenever it is necessary to replace the cover 3, and as shown, its purpose is to regulate the heat and draft of the tank 12 from the chamber 6. The edge holding device consists of two endless chains 23 mounted on sprockets 24 the latter being driven by gears 29. The guide frames 25 pivot on the pin 28 and are forced together under tension by means of the spring 30 and the screw 27.

Having described my invention, what is claimed is:—

1. In an apparatus for drawing sheet glass, a receptacle for containing a prepared mass of molten glass, means, including an endless metal belt carrier for drawing a continuous sheet of glass from the mass of glass in said receptacle, said metal belt carrier being the means for bending the sheet, the means for supporting and carrying the sheet and the means for flattening the sheet, said metal belt carrier continuously contacting the sheet of glass from the moment that the sheet starts to bend until it is sufficiently flattened and set for the lehr, and means for holding under tension a desired vertical length of the sheet's edge, for maintaining a predetermined width of the sheet drawn.

2. In an apparatus for drawing sheet glass, a receptacle for containing a mass of prepared molten glass, an endless metal belt having an entirely smooth and flat outside surface, one end of said belt being over the receptacle and the belt extending horizontally therefrom, means for applying pressure upon the edges of a drawn sheet so as to furnish the necessary draft to the sheet, and means for maintaining the width of the sheet during its upward travel.

3. In an apparatus for drawing sheet glass, a receptacle for containing molten glass, an endless continuously moving metal belt forming the means to deflect the sheet of glass from a relatively vertical to a relatively horizontal plane so as to furnish means of support to the drawn sheet continuously and constantly from the beginning of the bend until the desired hardness and flatness is attained, endless chains continuously moving with and weighing down upon the edges of the sheet and together with the continuously moving belt forming the necessary means for drawing the sheet of glass, and means for maintaining the width of the sheet during its upward travel.

4. In an apparatus for drawing sheet glass, a receptacle for containing a prepared mass of molten glass, drawing means consisting of an endless continuously moving metal belt, the sheet-contacting surface of which is entirely flat and smooth, and means holding the edges of the upper run of the sheet in drawing contact with the belt, the belt being so located that glass may be drawn upward from the receptacle, bent over one end of the belt, and flattened upon the upper run of the belt.

5. In an apparatus for drawing sheet glass, a receptacle for containing a prepared mass of molten glass, drawing means consisting of an endless continuously moving metal belt having a continuous and smooth sheet-contacting surface, the belt being so located that glass may be drawn upward from the receptacle, bent over one end of the belt, and flattened upon the upper run of the belt. means holding the edges of the upper run of the sheet in drawing contact with the belt, and means for maintaining the width of the sheet during its upward travel.

6. In an apparatus for drawing continuous sheet glass, the combination with a receptacle containing molten glass, of an endless metal belt having a flat and smooth sheet-carrying surface, a plurality of drums about which the belt is looped so that the upper run of the belt forms a substantially horizontal surface, means within the loop for supporting the upper horizontal run of the belt, one of the drums being mounted above the receptacle, and the belt being so driven that the upper run of the belt continually recedes from the receptacle, the glass sheet being drawn up from the receptacle, bent over the looped end of the belt and carried off in the horizontal plane on the upper run of the belt, and means above the horizontal run of the belt for holding the sheet in drawing contact with the belt.

7. In an apparatus for drawing continuous sheet glass, a receptacle containing molten glass, and sheet drawing means comprising an endless moving metal belt, the sheet-carrying surface of which is entirely flat and smooth, forming the means to deflect the sheet of glass from a relatively vertical to a relatively horizontal plane, and to form a flat support for the drawn sheet in the horizontal plane until the sheet becomes hard and set.

8. The process of drawing glass in sheet form from a mass of molten glass, consisting in continuously drawing the sheet upwardly from the molten mass, carrying the unbroken sheet from the vertical to a horizontal plane on a smooth metallic surface moving with the sheet, supporting the sheet directly on this metallic surface until it is set in flat sheet form, and then conveying the sheet off into a leer.

9. The process of drawing sheet glass, consisting in continuously drawing the sheet upwardly from a mass of molten glass, bending the glass into the horizontal plane, flattening it in the horizontal plane and carrying it away into a leer, the sheet being directly supported during the bending and flattening operations on the smooth surface of an endless metallic belt moving with the sheet.

Signed at Cleveland, in the county of Cuyahoga and State of Ohio, this 1st day of May, 1922.

JOHN C. CROWLEY.